United States Patent [19]

Schroter

[11] Patent Number: 4,662,540
[45] Date of Patent: May 5, 1987

[54] APPARATUS FOR DISPENSING MEDIUM TO HIGH VISCOSITY LIQUIDS WITH LIQUID FLOW DETECTOR AND ALARM

[75] Inventor: Damon C. Schroter, Ballston Spa, N.Y.

[73] Assignee: Robotics Incorporated, Ballston Spa, N.Y.

[21] Appl. No.: 580,805

[22] Filed: Feb. 16, 1984

[51] Int. Cl.$^4$ .............................................. B67D 5/08
[52] U.S. Cl. ..................................... 222/55; 137/12; 137/557; 340/606; 340/626
[58] Field of Search ............... 222/52, 55; 414/744 R, 414/749; 137/12, 557; 340/606, 608, 609, 626; 73/53, 861.04

[56] References Cited

U.S. PATENT DOCUMENTS

| | | | |
|---|---|---|---|
| 3,237,634 | 3/1966 | Colby, Jr. | 137/557 |
| 3,252,441 | 5/1966 | Hargreaves | 222/52 |
| 3,604,262 | 9/1971 | Craddock | 340/606 X |
| 3,790,042 | 2/1974 | McCormick et al. | 222/52 |
| 3,898,637 | 8/1975 | Wolstenholme | 128/DIG. 13 X |
| 4,014,206 | 3/1977 | Taylor | 340/608 X |
| 4,072,934 | 2/1978 | Hiller et al. | 340/608 |
| 4,215,746 | 8/1980 | Halldeni et al. | 137/557 X |
| 4,324,366 | 4/1982 | Geier et al. | 222/55 |
| 4,432,468 | 2/1984 | Siff et al. | 222/55 |
| 4,472,967 | 9/1984 | Godfrey | 222/55 |

FOREIGN PATENT DOCUMENTS 35217 2/1981 European Pat. Off. ............. 222/52

Primary Examiner—Albert J. Makay
Assistant Examiner—Steven E. Warner
Attorney, Agent, or Firm—Charles W. Helzer

[57] ABSTRACT

A medium to high viscosity liquid flow detector and alarm sub-system for use with apparatus for automatic liquid dispensing machines for mastics, sealants, adhesives, and the like, comprising a liquid pressure sensing device disposed in the liquid flow path of the liquid dispensing gun of the machine. The liquid pressure sensing device derives an output electrical signal indicative of the instantaneous liquid pressure in the liquid flow path. A differentiating circuit differentiates the liquid pressure indicating signal to derive a rate of change in fluid pressure signal. The rate-of-change signal is supplied to an indicator for signalling the existence of an undesired rate-of-change in liquid pressure condition and is indicative of a bubble or void in the liquid mastic, sealant, or the like being dispensed. The rate-of-change signal is supplied to a first comparator which also has supplied thereto an input bubble size reference signal that establishes a predetermined size bubble or void below which no alarm signal will be produced. Upon the occurrence of a bubble or void which is greater than that established by the adjustable bubble size reference signal, an output alarm signal is produced.

28 Claims, 3 Drawing Figures

4,662,540

1

APPARATUS FOR DISPENSING MEDIUM TO HIGH VISCOSITY LIQUIDS WITH LIQUID FLOW DETECTOR AND ALARM

FIELD OF INVENTION

This invention relates to the art of automatically dispensing medium to high viscosity liquid such as adhesives, mastics, sealants, and the like and having an effective range of viscosity from about 1000 to 1,000,000 cps.

More particularly, the invention relates to an automatically operated detection and alarm system for sensing the occurrence of bubbles or voids in a medium to high viscosity liquid being automatically dispensed, and providing an output indication of the ocurrence of such bubbles or voids.

BACKGROUND PRIOR ART PROBLEM

With the introduction and widespread adoption in many industries of automatically operated liquid dispensing machines, such as the cam driven machines disclosed in U.S. Pat. No. 4,155,272—issued May 2, 1979 for a "Low Cost Cam Controlled Positioning Apparatus", and in U.S. Pat. No. 4,306,464—issued Dec. 22, 1981 for a "Multi-Directional Mechanical Positioning Apparatus"—Ralph S. Mosher, inventor, and assigned to Robotics, Inc. of Ballston Spa, New York, USA, and with numerical control machines programmed for automatic liquid dispensing, a problem arises during operation of such automatic dispensing machines upon the occurrence of a bubble or void in the liquid mastic, adhesive, sealant, etc., being automatically dispensed. For example, if the automatic dispensing machine is dispensing a medium viscosity liquid such as a silicone sealant around a valve cover for the head of an automotive engine for use as a gasket, the occurrence of a bubble or void in the sealant at a particular point in the travel of the automatically positioned sealant dispensing gun, could result in a leak in the gasket being formed. In order to avoid the production of such faults in automatically dispensed medium to high viscosity liquids, the present invention was devised.

SUMMARY OF INVENTION

It is therefore a primary object of the present invention to provide an automatically operating detection and alarm system for sensing and signalling the occurrence of bubbles or voids in a medium to high viscosity liquid being automatically dispensed.

In practicing the invention, a novel medium to high viscosity liquid flow detector and alarm sub-system is provided for use with apparatus for automatically dispensing medium to high viscosity liquids and comprises a fluid pressure sensing device disposed in the liquid flow path of the liquid dispensing gun comprising a part of the automatically operated liquid dispensing apparatus. The fluid pressure sensing device serves to derive an output electrical signal indicative of the instantaneous liquid pressure in the fluid flow path. A signal processing circuit is responsive to the output electrical signal from the liquid pressure sensing device and comprises a differentiating circuit for differentiating the liquid pressure indicating signal to derive a rate of change in liquid pressure signal. The rate-of-change in liquid pressure signal is supplied to an indicator for indicating the existence of an undesired rate-of-change in liquid pressure condition caused by the occurrence of a bubble or void in the liquid being dispensed. The rate-of-change signal preferably is supplied to a first comparator which has in addition supplied thereto an input reference signal that establishes a predetermined size bubble or void below which no alarm signal will be produced. Upon the occurrence of a bubble or void which is greater than that established by the adjustable bubble size reference signal, an output alarm signal is produced which acutates a latching relay or other device which signals the controller of the host liquid dispensing equipment of the occurrence of the bubble. This latching relay then must be deliberately unlatched by the controller of the host dispensing equipment thereby assuring that the host equipment controller has had adequate time within which to acknowledge and process the alarm signal and provide for suitable correction of any flow as a result of the occurrence of the bubble or void.

Another feature of the invention is the provision of additional low and high pressure comparators for comparing the steady state value of the medium to high viscosity liquid pressure within the dispensing gun and signalling the occurrence of either an over pressure or an under pressure condition that would be indicative of faulty parts or operating conditions within the automatic liquid dispensing system. The outputs from the high and low pressure comparators also are supplied to a NOT-AND logic circuit for deriving a normal operating condition indicating signal for use in informing an operator of the equipment that conditions are acceptable for continuing operation of the automatic dispensing system.

A further feature of the invention is the provision of a turn-on/turn-off control for the processing circuit employed in processing the output from the liquid pressure sensing device. This turn-on/turn-off control serves to inactivate the processing circuit in response to normal operating control signals supplied from the host equipment controller to turn-on and turn-off the dispensing gun so that erroneous alarm conditions are not produced from normal changes in pressure of the dispensing equipment as the liquid dispensing gun is turned on and off in a normal programmed manner as required by a particular pattern of mastic or other liquid being dispensed.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIG. 3 is an operating characteristic curve showing the pressure versus time characteristics of a liquid dispensing gun.

BEST MODE OF PRACTICING THE INVENTION

Figure 1:
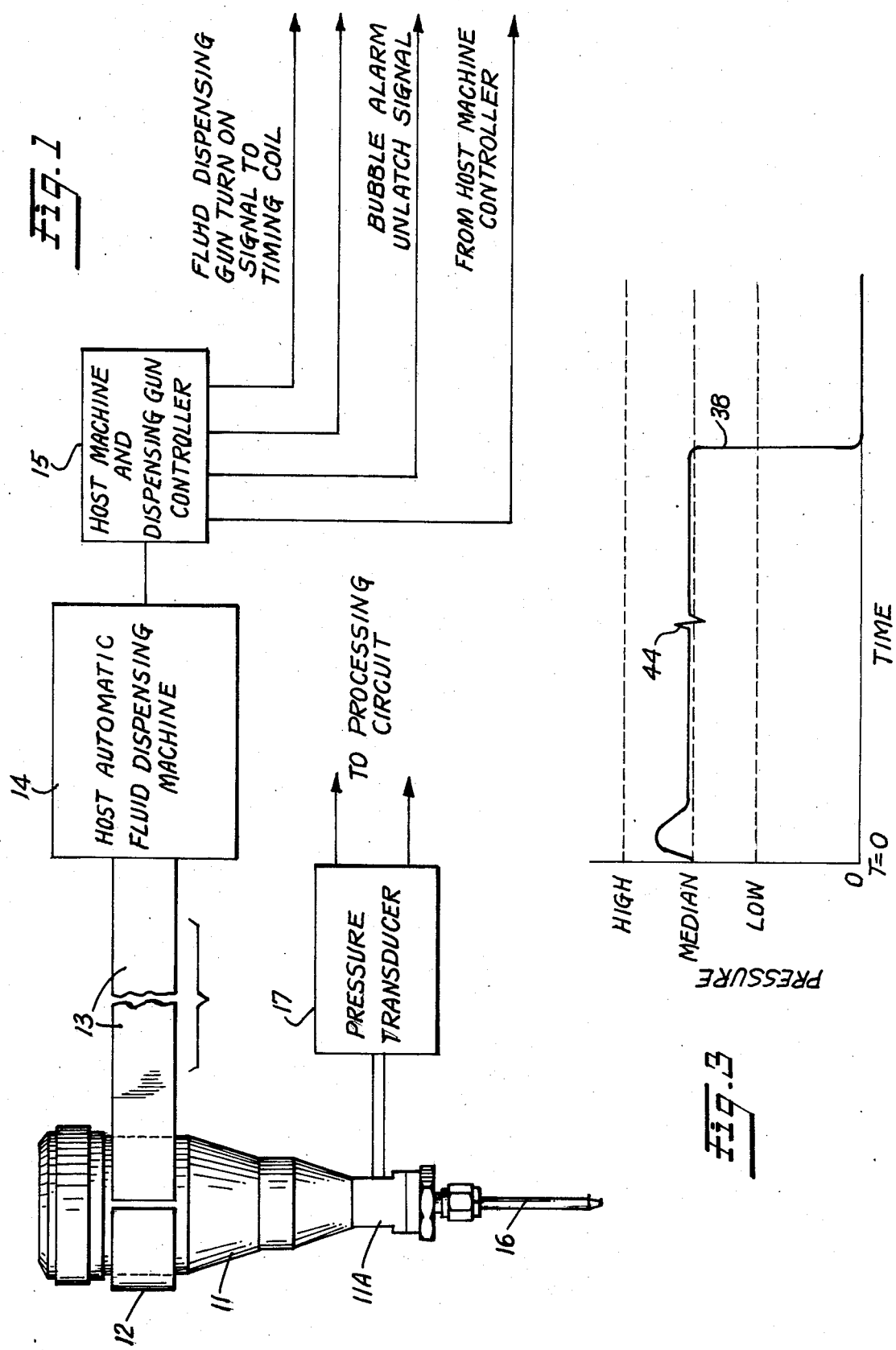
FIG. 1 is a functional block diagram illustrating the manner in which a pressure transducer is mounted on and supported by an automatically positioned liquid dispensing gun driven by a host automatic liquid dispensing machine of known construction.

FIG. 1 is a functional block diagram of an automatic liquid dispensing system which includes a liquid flow detector and alarm sub-system constructed in accordance with the present invention. In FIG. 1 a bottle-shaped liquid dispensing gun 11 is held within a bracket 12 at the end of a movable arm 13 driven by an automatic positioning host liquid dispensing machine shown generally at 14. The host liquid dispensing machine 14 may comprise any known automatically positioning machine of the type such as discribed in the above-referenced U.S. Pat. No. 4,155,272 or 4,306,464, or alternatively may comprise a numerical control machine appropriately programmed to provide automatic positioning and dispensing of a medium to high viscosity liquid such as mastics, sealants, adhesives and other similar materials. For a more detailed description of the construction and operation of the host automatic liquid dispensing equipment 14, reference is made to the above-noted patents. Briefly, however, it should be stated that such machines include a programmable controller 15 which will cause the movable arm 13 of the machine to move the dispensing gun including dispensing gun 11 to different positions along a preprogrammed path of movement and concurrently will control dispensing of the mastic or other medium to high viscosity liquid either continuously or at desired points along the path of movement of the dispensing gun. It will be appreciated therefore, that in addition to the mechanical positioning of the dispensing gun 11, the host equipment controller 15 also controls turn-on and turn-off of a valve that controls dispensing of the liquid material and which comprises an integral part of the dispensing gun 11. For the sake of simplicity, the supply of liquid material and necessary associated pumping and fluid piping interconnections to the dispensing gun, has not been shown. The liquid material thus supplied will flow out through the nozzle 16 as is well known to those skilled in the automatic liquid dispensing art.

From the above brief description, it will be appreciated that the liquid material being dispensed is supplied by dispensing gun 11 under pressure down through a chamber portion 11A and out through the nozzle 16. The purpose of the invention is to detect and alarm improper pressures or sudden pressure transitions appearing at the nozzle of the dispensing gun so that the potential for voids in the resulting dispensed bead of liquid material, due for example to inadequate liquid flow, a restricted nozzle, turn-off or breakdown of the liquid supply pump, etc., can be reduced or eliminated. In addition to the above-listed malfunctions, bubbles or voids occurring in the dispensed beads can be caused by small gas occlusions present in the liquid materials being dispensed as well as equipment malfunctions. Such small gas occlusions usually are of a short duration transient nature and occur only randomly. In contrast, equipment malfunctions normally will generate steady state conditions.

In the present invention, a pressure transducer is shown at 17 which may comprise a bridge type, strain gage pressure transducer and transmitter of known, commercially available construction, such as those produced and sold by Barksdale Division of Transamerica-Laval, Foxboro-ICI or Celesco. The pressure transducer-transmitter 17 is mounted to sense the pressure of the liquid in the chamber 11A of the dispensing gun 11 just prior to the dispensing nozzle 16. It is at this point that liquid pressure variations which can be related to bead application failure, can be detected. Gas occlusions occurring in the liquid being dispensed represent a radical lowering of liquid viscosity and therefore lowered drag during transition through the dispensing nozzle 16. Reduced drag due to the presence of a gas occlusion allows gas in the occlusion to move through the nozzle at a much higher velocity than the liquid normally dispensed. This causes a momentary pressure reduction in the chamber portion 11A of the dispensing gun above the nozzle until such time that the chamber portion refills with liquid from the main container portion of gun 11. The pressure transducer 17 senses this pressure reduction and derives an amplified electric output signal which then is supplied to processing circuitry shown in FIG. 2 of the drawings.

Figure 2:
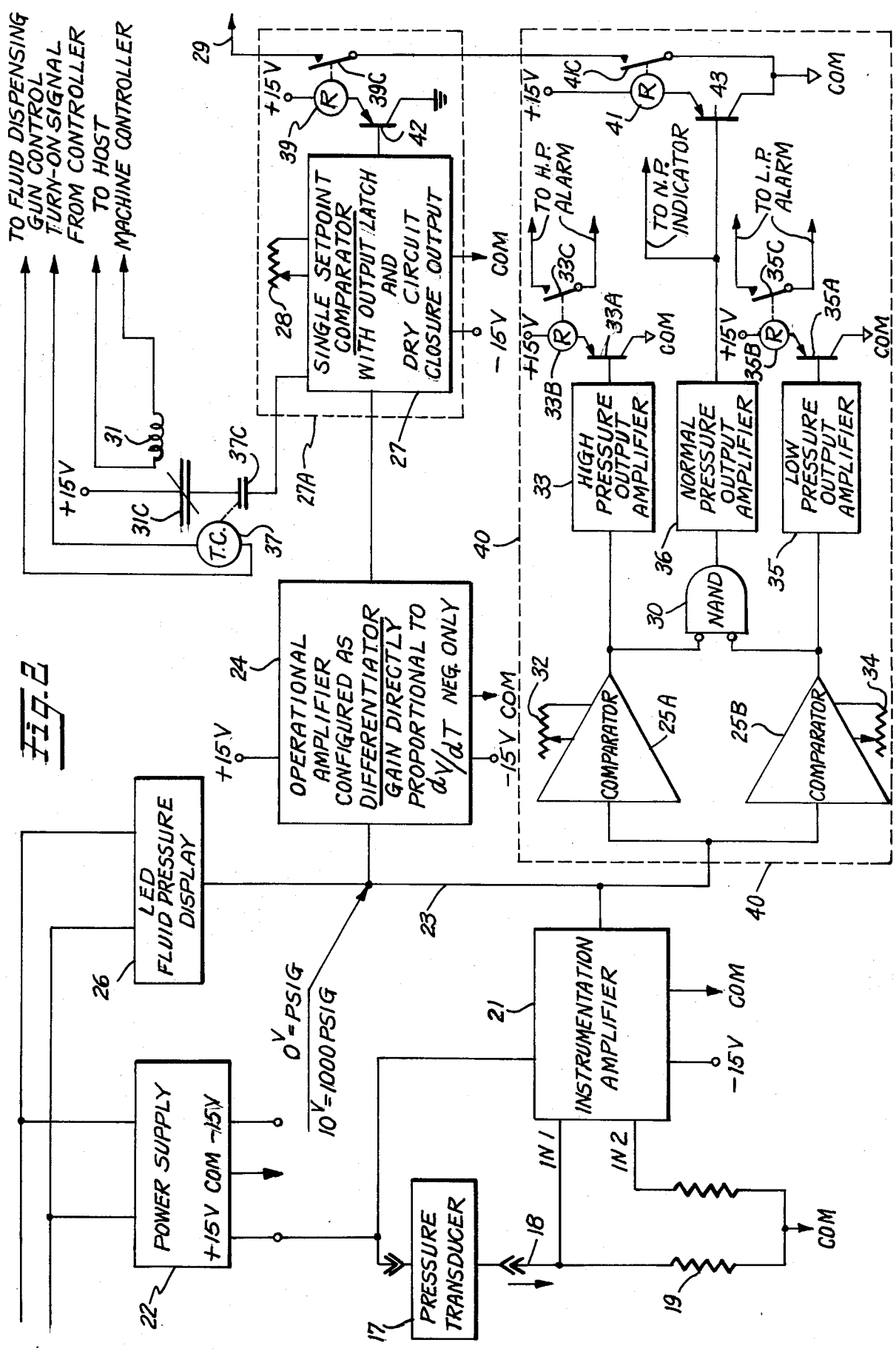
FIG. 2 is a functional block diagram of the signal processing circuitry employed in the novel liquid pressure sensor and alarm sub-system comprising a part of the invention.

FIG. 2 is a functional block diagram of the processing circuitry used to process the pressure indicating signal derived by the pressure transducer shown at 17. The output signal from pressure transducer 17 is supplied over a conductor 18 and input resistor 19 to the input of an instrumentation amplifier 21. Instrumentation amplifier 21 offsets and further amplifies the preamplified liquid pressure indicating signal and supplies the amplified signal over output conductor 23 to the input of an operational amplifier 24 configured to operate as a differentiating circuit, to the input of two set point comparator circuits 25A and 25B and to the input of a light emitted diode (LED) liquid pressure digital display 26. Excitation power for the pressure transducer 17 as well as the other elements of the processing circuitry listed above is supplied from a conventional power supply 22.

Operational amplifier 24 is designed to operate as a differentiator wherein the signal amplification is directly proportional to the change in voltage with respect to time (dv/dt) of the input liquid pressure indicating signal. This corresponds to the rate-of-change of the pressure and provides an output change in pressure with respect to time indicating signal upon the occurrence of a bubble or void in the liquid being dispensed. The signal is produced by energy stored in the form of compressed gas within the bubble and released at the nozzle upon the bubble arriving at the nozzle. This causes a shock wave to be propagated back through the fluid being dispensed to the pressure transducer. As a result, the transducer is subjected to a rapid negative going deviation in pressure with respect to its nominal value operating pressure. Essentially, the differentiator 24 greatly amplifies only sudden sharp excursions of signal amplitude in contrast to slowly changing signals which are amplified very little or not at all. The occurrence of a gas bubble or void in the liquid being dispensed results in a short rapid excursion and high rate of change in the signal level of the output signal supplied from pressure transducer 17 to the input of instrumentation amplifier 21 where it is amplified and supplied to the input of differentiator 24.

Differentiator 24 greatly amplifies the high rate-of-change signal only and supplies an output signal corresponding in magnitude to the rate of change to the input of a single set point comparator 27. Comparator 27 includes a variable resistor 28 for setting an adjustable threshold reference voltage that is applied as a second input to comparator 27. By appropriate adjustment of the variable resistor 28, the adjustable threshold reference voltage can be set to reject rate-of-change signals and hence bubbles or voids deemed too small to be consequential on the liquid bead being dispensed by dispensing gun 11 in FIG. 1. It will be appreciated therefore that the reference voltage applied through variable resistor 28 in effect constitutes a bubble size reference voltage, which if exceeded by the differentiated rate-of-change signal supplied from differentiator 24, results in the output of a bubble detect signal at an output terminal 29 via a transistor 42, a relay 39 and a normally open contact 39C of relay 39 for supply to an alarm, a visual display, or the like. The transistor 42 and relay 39, 39C all may comprise a part of an integrated circuit structure 27A along with the comparator 27. The output at 29 also is supplied back to the host machine controller 15 in FIG. 1 for identification and placement of the location where the bubble or void occurred whereby correction of the defect in the dispensed bead can be accomplished.

The output from the comparator 27 also is supplied internally to a latching relay (not shown) comprising a part of the comparator 27 in advance of transistor 42 and which latches comparator 27 on in the alarm output condition. This internal latching relay remains set in the on condition until reset by opening a normally closed contact 31C whose reset winding 31B is under the control of the host machine controller 15 shown in FIG. 1. The controller 15 must unlatch the internal latching relay by opening contacts 31C after it has been latched in the on condition by an output bubble signal from the comparator 27. This "handshake" interlocking action between the comparator 27 and the host machine controller 15 assures that the bubble signal appearing at output terminal 29 is present for a sufficient time for the host machine controller 15 to process it.

The comparator circuit 25A has supplied thereto in addition to the pressure indicating signal supplied over conductor 23 from the output of amplifier 21, a high reference pressure set point signal from a variable resistor 32 which establishes a maximum pressure level below which the dispensing system is designed to operate. Excessive elevation of the liquid pressure in the dispensing gun nozzle 16 could be indicative of the fact that the liquid pressure regulator has been damaged or tampered with, the dispensing gun nozzle 16 has been partly or fully clogged, or that an incorrect nozzle has been installed on the equipment. In the event that the steady state value of the input pressure indicating signal supplied over conductor 23 exceeds the reference high pressure signal level provided from adjustable resistor 32, the comparator 25A will provide a high pressure alarm signal through an output amplifier 33, a transistor 33A and relay 33B which closes normally open contacts 33C in response to the high pressure alarm signal. The resulting high pressure alarm output signal then is used by the host machine controller 15 to close down operation of the dispensing system or to take other corrective action.

The second comparator circuit 25B in addition to the input liquid pressure indicating signal from conductor 23, has applied thereto a low pressure reference signal developed by a low reference pressure adjustable resistor 34 for establishing a low reference pressure level below which the liquid dispensing system does not operate properly. The second comparator 25B will supply at its output and through a low pressure alarm signal amplifier 35, a low pressure alarm signal in the event that the steady state value of the liquid pressure indicating signal supplied over conductor 23 falls below the reference low pressure signal established by the adjustable resistor 34. The low pressure alarm signal at the output of the second comparator 25B is applied through a transistor 35A and relay winding 35B to close a set of normally open contacts 35C. The low pressure output alarm signal appearing across contacts 35C upon their closure then may be supplied to suitable alarm circuits or to the controller 15 of the host machine to shutdown the system, etc. The presence of the low pressure signal may indicate that the liquid pressure regulator has been tampered with or damaged, or that an incorrect sized nozzle has been installed or that the liquid supply pump has been shut off or has failed in service.

In addition to providing either a high pressure alarm signal or a low pressure alarm signal from the respective output amplifiers 33 and 35, the dual set point comparator circuit shown by the dotted outline box 40 further includes a NAND logic circuit 30 of conventional construction which has supplied to its inputs the respective high pressure and low pressure alarm output signals from comparators 25A and 25B. Under conditions where neither a high pressure alarm signal nor a low pressure alarm signal is present at the output of either of the dual comparators, then the NAND logic circuit 30 will indicate the condition that neither signal is not present and produce at its output a normal pressure indicating signal. This normal pressure signal is amplified by amplifier 36 and supplied back to the host machine controller 15 or to other suitable indicators for informing operators of the automatic dispensing system that the system is functioning normally within its prescribed parameters.

The amplified liquid pressure indicating signal appearing across conductor 23 also is supplied to the LED liquid pressure digital display 26 for providing a visual digital display of the instantaneous value of the liquid pressure developed in dispensing gun 11 at the chamber 11A just prior to being dispensed by dispensing nozzle 16. This visual display is in addition to the above-described automatically operating alarm and control signals developed in response to operating conditions affecting the dispensing gun 11. The visual display also is used for calibration and testing of set points for the overall liquid dispensing system.

In any automatically positioned control dispensing machine such as those described in the above-noted U.S. Pat. Nos. 4,155,272 or 4,306,464, the machine itself during normal operation will control turn-on and turn-off of the dispensing gun 11 as the gun is caused to trace out a particular pattern of bead formation with the medium to high viscosity mastic or other liquid being dispensed either continuously or at particular points in the pattern of movement of the dispensing nozzle 16. It follows that as the dispensing gun is turned on and off in response to control signals from the host machine controller 15, that the pressure of the fluid being dispensed within the chamber 11 of the gun will rise and fall automatically in response to turn-on and turn-off of the gun. This abrupt rise and fall in pressure if allowed to trigger the processing circuitry shown in FIG. 2, would result in erroneous alarm signals and consequent undesired shutdown in operation of the machine. To prevent development of such erroneous alarm signals, selectively operated turn-on, turn-off circuit means are provided for selectively enabling and disenabling the output from the alarm signal processing circuitry with control signals supplied from controller 15 and/or the processing circuitry.

The turn-on, turn-off circuit means for selectively enabling and disenabling the alarm signal processing circuitry is comprised by a timing coil shown at 37 in FIG. 2. The timing coil 37 is coupled to (and after a preset delay time period) automatically closes and holds closed normally open contacts 37C which are connected between the +15 volt power source and the single set point comparator 27. Timing coil 37 is supplied with and energized by control signals from controller 15 which are indicative of the turn-on of the liquid dispensing gun 11. FIG. 3 is a pressure versus time characteristic curve of the increase in pressure within gun 11 by turn-on of the gun at time t=0. From this curve it will be seen that the pressure immediately rises towards its median value, assuming that the system is in proper operating order, and that immediately following turn-on at time t=0, will rise substantially above the median value pressure and then drop back down towards the design median value. This hump or perturbation in the pressure characteristics of the dispensing gun caused by a snuffer plug used in preferred dispensing guns immediately following turn-on, could produce an erroneous alarm output signal from the processing circuitry if some measure were not taken to offset its effect. The measure taken in FIG. 2 is to include the normally open contacts 37C in the power supply to the single set point comparator 27. The contacts 37C do not close until the timing coil 37 has timed out and causes them to close at a point in time immediately following the return of the pressure characteristic of the gun to its median value as shown in FIG. 3. By this expedient, the production of an erroneous alarm signal during normal operation of the liquid dispensing system, is avoided.

In FIG. 3 it will be seen that upon turn-off of the liquid dispensing gun 11, the fluid pressure drops substantially to zero as shown at 38. In order to avoid the production of an erroneous alarm due to the drop in pressure shown at 38, a relay implemented AND circuit is provided to AND together the outputs from the single set point comparator 27 and the normal pressure output from amplifier 36. This relay implemented AND circuit is comprised by relay 39 having its normally open contact 39C connected in series circuit relationship with the normally open contact 41C of a second relay 41 with the series circuit thus comprised being interconnected between the output terminal 29 and ground. Relay winding 39 is connected between a +15 volt power supply terminal and a grounding transistor 42 having its emitter connected to relay winding 39, its collector connected to common ground and its base connected to the output from the single set point comparator 27. Similarly, the relay winding 41 is connected in series circuit with the +15 volt power supply terminal and a grounding transistor 43 to the common ground. Relay winding 41 is connected to the emitter of transistor 43 with the collector being connected to the common ground and the base being connected to the output from the normal pressure output amplifier 36. The dual set point comparator circuit 40 including the elements 33A, 33B, 33C, and elements 35A, 35B, 35C together with transistor 43 and relay 41, 41C all may be constructed together as a hybrid or monolithic circuit structure.

With the above-described arrangement, it will be seen that an output signal from the normal pressure output amplifier must be present at the base of transistor 43 for the contact 41C to be closed thereby completing a common ground connection through the contact 39C of relay 39 before a bubble alarm output signal can be produced and supplied to the controller 15 via output terminal 29. During normal operation of the liquid dispensing system, with the pressure in the dispensing gun 11 at its median value as shown in FIG. 3, in the event of the occurrence of a bubble or void in the liquid as shown at 44 in FIG. 3, a high rate-of-change output signal pulse will be supplied to the base of transistor 42 causing relay 39 to close contact 39C thereby providing a bubble alarm output signal at output terminal 29 for supply to the controller 15. This is due to the fact that under the conditions shown at 44 in FIG. 3, a normal pressure output signal will be present at the output of amplifier 36 so that transistor 43 is turned-on and relay contacts 41C are closed thereby completing the circuit between the +15 volt power supply terminal, output terminal 29 and the common ground through relay contacts 39C.

In contrast to the above-described situation, under the conditions shown at 38 in FIG. 3, no signal will be present at the output of the normal pressure output amplifier 36 so that relay contacts 41C will be open. Under these conditions, no bubble alarm output signal can or will be produced at output terminal 29.

It will be appreciated from the above description that the relays 39 and 41 in conjunction with the timing coil 37 in fact constitute a selectively operated turn-on, turn-off circuit means for selectively enabling and disenabling the output from the alarm signal processing circuitry with control signals supplied from controller 15 and/or the processing circuitry. Other circuit means for disenabling the alarm circuitry under normal operating conditions of the liquid dispensing gun will be obvious to those skilled in the art in the light of the above teachings. For example, a clamping circuit could be connected in parallel across the input of the instrumentation amplifier 21 for clamping its input to ground in response to control signals from the controller 15 during normal turn-on and turn-off of the dispensing gun 11.

All of the above described components of the signal processing circuit including the pressure transducer 17, the instrumentation amplifier 21, the differentiating operational amplifier 24, the dual set point comparator circuit 25 and the single set point comparator circuit 27 may comprise conventional, commercially available prefabricated circuits supplied from manufacturers such as the Calex Manufacturing Company of Pleasant Hill, Calif. or other similar integrated circuit devices manufacturers. Further, when the system is used with very low viscosity liquids in the neighborhood of 1000 cps, it may be desirable to change the nozzle on the dispensing gun 11 to provide a more restrictive nozzle whereby adequate changes in pressure will be produced to be detectable upon the occurrence of a bubble or void.

INDUSTRIAL APPLICABILITY

From the foregoing description, it will be appreciated that the invention provides a novel automatically operating protection and alarm method and system for sensing the occurrence of bubbles or voids in a medium to high viscosity liquid such as mastics, adhesives, sealants and the like which are being automatically dispensed by an automatically positioned and controlled dispensing gun. The novel system provides an output indication of the occurrence of bubbles or voids as well as other abnormal operating conditions during operation of the automatic dispensing system but avoids production of erroneous alarm signals during normal turn-on, turn-off of the dispensing gun while operating.

Having described one embodiment of a method and system for dispensing medium to high viscosity liquids with liquid flow detection and alarm constructed in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. An automatic liquid dispensing machine for dispensing sealants, mastics, adhesives and like medium to high viscosity liquids, said machine comprising medium to high viscosity sealant, mastic, adhesive and the like liquid automatic dispensing means, liquid pressure sensing means disposed in the liquid flow path of said automatic liquid dispensing means, said liquid pressure sensing means serving to derive a fluid pressure indicating electrical signal indicative of the instantaneous liquid pressure in said sealants, mastics, adhesives and the like medium to high viscosity liquid flow path, and electrical signal processing circuit means responsive to said liquid pressure indicating electrical signal, said signal processing circuit means comprising differentiating circuit means responsive to said liquid pressure indicating electrical signal for differentiating the said liquid pressure indicating electrical signal to derive a rate-of-change in liquid pressure electrical signal, and bubble indicator means responsive to said liquid pressure rate-of-change electrical signal for detecting the existence of an undesired rate-of-change in liquid pressure condition indicative of the occurrence of a bubble.

2. An automatic liquid dispensing machine according to claim 1 further including comparator means for comparing the steady state value of the liquid pressure indicating signal to a reference maximum value pressure signal and deriving an output indication of an over pressure condition in the event that the steady state value of the liquid pressure indicating signal exceeds the reference maximum value pressure signal.

3. An automatic liquid dispensing machine according to claim 1 further including comparator means having the steady state value liquid pressure indicating signal applied thereto as one input and having a reference minimum value pressure signal applied thereto for comparison to steady state value of the liquid pressure indicating signal and deriving an output alarm signal in the event that the steady state value of liquid pressure indicating signal falls below the value of the reference minimum value pressure signal.

4. An automatic liquid dispensing machine according to claim 1 further including latching relay circuit means responsive to the output from said bubble indicator means for maintaining said bubble indicator means in a latched-on condition whereby the bubble indicator means continues to indicate the existence of an undesired rate-of-change in liquid pressure condition, said latching relay circuit means also being responsive to an unlatching control signal from an automatic liquid dispensing machine controller that controls overall operation of the automatic liquid dispensing machine whereby upon the bubble indicator means being actuated to indicate the existence of undesired rate-of-change in liquid pressure condition, it is maintained in the latched-on condition unless and until it is returned to its normal unlatched condition by the automatic liquid dispensing machine controller.

5. An automatic liquid dispensing machine according to claim 1 further including turn-on/turn-off circuit means coupled to and controlling response of said signal processing circuit means and in turn responsive to and controlled by a control signal for selectively turning on and off said signal processing circuit means under normal operating conditions of the liquid dispensing machine wherein abrupt pressure changes in the liquid being dispensed normally occur thereby avoiding the production of erroneous alarm signals which otherwise would result from abrupt liquid pressure changes due to normal on-off switching of the automatic dispensing machine in a preprogrammed dispensing pattern of movement.

6. An automatic liquid dispensing machine according to claim 1 wherein the bubble indicator means includes first comparator means having the liquid pressure rate-of-change signal supplied thereto along with an adjustable reference value bubble size indicating signal for use in comparing the magnitude of the liquid pressure rate-of-change signal to the reference value bubble size signal and deriving an output alarm signal upon the liquid pressure rate-of-change signal exceeding the reference value bubble size signal.

7. An automatic liquid dispensing machine according to claim 6 further including second comparator means having supplied thereto the steady state liquid pressure indicating signal in conjunction with a reference maximum liquid pressure level pressure signal for deriving an output indication upon the steady state value of the liquid pressure indicating signal exceeding the reference maximum pressure level signal, third comparator means having supplied thereto the liquid pressure indicating signal in conjunction with a reference minimum liquid pressure level signal for deriving an output indication upon the steady state value of the liquid pressure indicating signal dropping below the value of the reference minimum pressure level signal, and NAND logic circuit means having supplied to respective inputs thereof the outputs of the second and third comparators for deriving at the output of the NAND logic circuit a normal operating condition signal indicative of the fact that the steady state value of the liquid pressure indicating signal lies within an acceptable band of values between the reference maximum and minimum pressure levels.

8. An automatic liquid dispensing machine according to claim 7 further including latching relay circuit means responsive to the output from said bubble indicator means for maintaining said bubble indicator means in a latched-on condition whereby the bubble indicator continues to indicate the existence of an undesired rate-of-change in liquid pressure condition, said latching relay circuit means also being responsive to an unlatching output command control signal from an automatic dispensing machine controller that controls overall operation of the liquid dispensing machine whereby upon the bubble indicator means being actuated to indicate the existence of undesired rate-of-change in liquid pressure condition, it is maintained in the latched-on condition unless and until it is returned to its normal unlatched condition by the automatic dispensing machine controller.

9. An automatic liquid dispensing machine according to claim 8 further including turn-on/turn-off circuit means coupled to and controlling response of said signal processing circuit means and in turn responsive to and controlled by a control signal from the automatic dispensing machine command controller for selectively turning on and off said signal processing circuit means under normal operating conditions of the liquid dispensing machine wherein abrupt pressure changes in the liquid being dispensed normally occur thereby avoiding the production of erroneous alarm signals which otherwise would result from abrupt liquid pressure changes due to normal on-off switching of the automatic liquid dispensing machine during its preprogrammed dispensing pattern of movement.

10. A sealant, mastic, adhesive and like medium to high viscosity liquid dispensing gun and alarm system for an automatic sealant, mastic, adhesive and the like liquid dispensing machine for dispensing medium to high viscosity sealant, mastic, adhesive and the like liquids comprising liquid pressure sensing means disposed in the liquid flow path of said liquid dispensing gun, said liquid pressure sensing means serving to derive an output liquid pressure indicating electrical signal indicative of the instantaneous liquid pressure in said sealant, mastic, adhesive and the like medium to high viscosity liquid flow path, and signal processing circuit means responsive to said liquid pressure indicating electrical signal from the liquid pressure sensing means, said signal processing circuit means comprising differentiating circuit means responsive to said liquid pressure indicating electrical signal for differentiating the said liquid pressure indicating electrical signal to derive a rate-of-change in liquid pressure electrical signal, and bubble indicator means responsive to said liquid pressure rate-of-change electrical signal for detecting the existence of an undesired rate-of-change in liquid pressure condition indicative of the occurrence of a bubble.

11. A liquid dispensing gun according to claim 10 further including comparator means for comparing the steady state value of the liquid pressure indicating signal to a reference maximum value pressure signal and deriving an output indication of an over pressure condition in the event that the steady state value of the liquid pressure indicating signal exceeds the reference maximum value pressure signal.

12. A liquid dispensing gun according to claim 10 further including comparator means having the steady state liquid pressure indicating signal applied thereto as one input and having a reference minimum pressure level signal applied thereto for comparison to the steady state liquid pressure indicating signal and deriving an output alarm signal in the event that the steady state liquid pressure indicating signal falls below the value of the reference minimum value pressure signal level.

13. A liquid dispensing gun according to claim 10 further including latching relay circuit means responsive to the output from said bubble indicator means for maintaining said indicator means in a latched-on condition whereby the bubble indicator continues to indicate the existence of an undesired rate-of-change in liquid pressure conditions, said latching relay circuit means also being responsive to an unlatching command control signal from a host liquid dispensing machine controller that controls overall operation of the host liquid dispensing machine on which the dispensing gun is used whereby upon the bubble indicator means being actuated to indicate the existence of undesired rate-of-change in liquid pressure condition, it is maintained in the latched-on condition unless and until it is returned to its normal unlatched condition by the host liquid dispensing machine controller.

14. A liquid dispensing gun according to claim 10 further including turn-on/turn-off circuit means coupled to and controlling said signal processing circuit means for selectively turning off and on output from said signal processing circuit means under normal operating conditions of the liquid dispensing machine on which the dispensing gun is used wherein abrupt pressure changes in the liquid being dispensed normally occur due to on-off switching of the dispensing gun while tracing out a pattern of liquid to be dispensed whereby erroneous alarm conditions which otherwise would result from such normal abrupt liquid pressure changes are prevented.

15. A liquid dispensing gun according to claim 10 wherein the bubble indicator means includes first comparator means having the liquid pressure rate-of-change signal supplied thereto along with an adjustable reference value bubble size indicating signal for use in comparing the magnitude of the liquid pressure rate-of-change signal to the reference value bubble size signal and deriving an output alarm signal upon the liquid pressure rate-of-change signal exceeding the reference value bubble size signal.

16. A liquid dispensing gun according to claim 15 further including second comparator means having supplied thereto the steady state liquid pressure indicating signal in conjunction with a reference maximum value pressure signal for deriving an output indication upon the steady state value of the liquid pressure indicating signal exceeding the value of the reference maximum pressure level signal, third comparator means having supplied thereto the steady state liquid pressure indicating signal in conjunction with a reference minimum pressure level signal for deriving an output indication upon the steady state value of the liquid pressure indicating signal dropping below the value of the reference minimum pressure level signal, and NAND loigic circuit means having supplied to respective inputs thereof the outputs of the second and third comparators for deriving at its output a normal operating condition signal indicative of the fact that the steady state value of the liquid pressure indicating signal lies within the band of values defined between the reference maximum and minimum pressure levels.

17. A liquid dispensing gun according to claim 16 further including latching relay circuit means responsive to the output from said bubble indicator means for maintaining said indicator means in a latched-on condition whereby the indicator continues to indicate the existence of an undesired rate-of-change in liquid pressure conditions, said latching relay circuit means also being responsive to an unlatching command control signal from a host liquid dispensing machine controller that controls overall operation of the host liquid dispensing machine on which the liquid dispensing gun is used whereby upon the bubble indicator means being actuated to indicate the existence of undesired rate-of-change in liquid pressure condition, it is maintained in the latched-on condition unless and until it is returned to its normal unlatched condition by the host liquid dispensing machine controller.

18. A dispensing gun according to claim 17 further including turn-on/turn-off circuit means coupled to and controlling said signal processing circuit means and in turn responsive to and controlled by a control signal from a host liquid dispensing machine command controller for selectively turning off and on output from said signal processing circuit means under normal operating conditions of the liquid dispensing machine on which the liquid dispensing gun is used wherein abrupt pressure changes in the liquid being dispensed normally occur due to on-off switching of the liquid dispensing gun while tracing out a pattern of liquid to be dispensed whereby erroneous alarm conditions which otherwise would result from such normal abrupt liquid pressure changes are avoided.

19. The method of detecting discontinuities due to bubbles or voids occurring in the flow of medium to high visocity sealant, mastic, adhesive and the like liquids while being dispensed, said method comprising sensing the pressure of the sealant, mastic, adhesive and the like medium to high viscosity liquid being supplied under pressure to a dispensing gun for the medium to high viscosity liquid, deriving an output electric signal representative of the instantaneous liquid pressure of the sealant, mastic, adhesive and the like medium to high viscosity liquid being supplied to the dispensing gun, differentiating the liquid pressure indicating electric signal to derive a rate-of-change in liquid pressure electrical signal representative of abrupt changes in pressure of the liquid being dispensed which in turn is indicative of the possible occurrence of a bubble or void in the sealant, mastic, adhesive and like liquid being dispensed, and employed the rate-of-change in liquid pressure electrical signal to indicate the possible occurrence of a bubble or void in the liquid being dispensed.

20. The method according to claim 19 further including comparing the steady state value of the liquid pressure indicating signal to a reference value low liquid pressure signal and deriving an output indication of a low pressure condition upon the steady state value of the liquid pressure indicating signal dropping below the reference value low liquid pressure signal.

21. The method according to claim 19 further including latching the indicator in its on-condition in response to an output rate-of-change signal indicative of the occurrence of a substantial size bubble or void in the liquid being dispensed and supplying the latched-on indicator with a turn-off "handshake" control signal from the command controller of a host automatic liquid dispensing machine employed in automatically dispensing the medium to high viscosity liquid whereby it is assured that the occurrence of the substantial size bubble or void in the liquid being dispensed is acknowledged by the command controller of the host liquid dispensing machine.

22. The method according to claim 19 further including turning on and off the processing of an electric signal representative of the instantaneous liquid pressure of the liquid being supplied to the dispensing gun in response to enabling and disabling command control signals from the command controller of a host automatic liquid dispensing machine controlling operation of the liquid dispensing gun whereby the signalling of erroneous alarm conditions does not result from abrupt liquid pressure changes that normally occur as the dispensing gun is switched on- and off while tracing out a preprogrammed pattern of movement and dispensing a predesigned bead of liquid.

23. The method according to claim 19 further including supplying the rate of change signal to a comparator for comparison to an adjustable reference value bubble size indicating signal and deriving an output indication of the possible occurrence of a bubble or void in the liquid being dispensed upon the rate-of-change signal exceeding the value of the reference value bubble size indicating signal.

24. The method according to claim 23 further including comparing the steady state value of the liquid pressure indicating signal to a reference value high liquid pressure signal and deriving an output signal indicative of an excessive liquid pressure condition upon the steady state value of the liquid pressure indicating signal exceeding the reference value high liquid pressure signal.

25. The method according to claim 24 further including comparing the steady state value of the liquid pressure indicating electric signal to a reference value low liquid pressure signal and deriving an output indication of a low pressure condition upon the steady state value of the liquid pressure indicating signal dropping below the reference value low liquid pressure signal.

26. The method according to claim 25 further including combining the outputs from said high liquid pressure and said low liquid pressure comparison steps and deriving an output indication of a normal liquid pressure condition where neither a high liquid pressure or a low liquid pressure indicating signal is present.

27. The method according to claim 26 further including latching the indicator in its on-condition in response to an output rate-of-change signal indicative of the occurrence of a substantial size bubble or void in the liquid being dispensed and supplying the latched-on indicator with a turn-off "handshake" control signal from the command controller of a host automatic liquid dispensing machine employed in automatically dispensing the medium to high viscosity liquid whereby it is assured that the occurrence of the substantial size bubble or void in the liquid being dispensed is acknowledged by the command controller of the host automatic liquid dispensing machine.

28. The method according to claim 26 further including turning on and off the processing of an electric signal representative of the instantaneous liquid pressure of the liquid being supplied to the liquid dispensing gun in response to enabling and disabling command control signals whereby the signalling of erroneous alarm conditions does not result from abrupt liquid pressure changes that normally occur as the dispensing gun is switched on and off while tracing out a preprogrammed pattern of movement and dispensing a predesigned bead of liquid.

* * * * *